Figure 1:
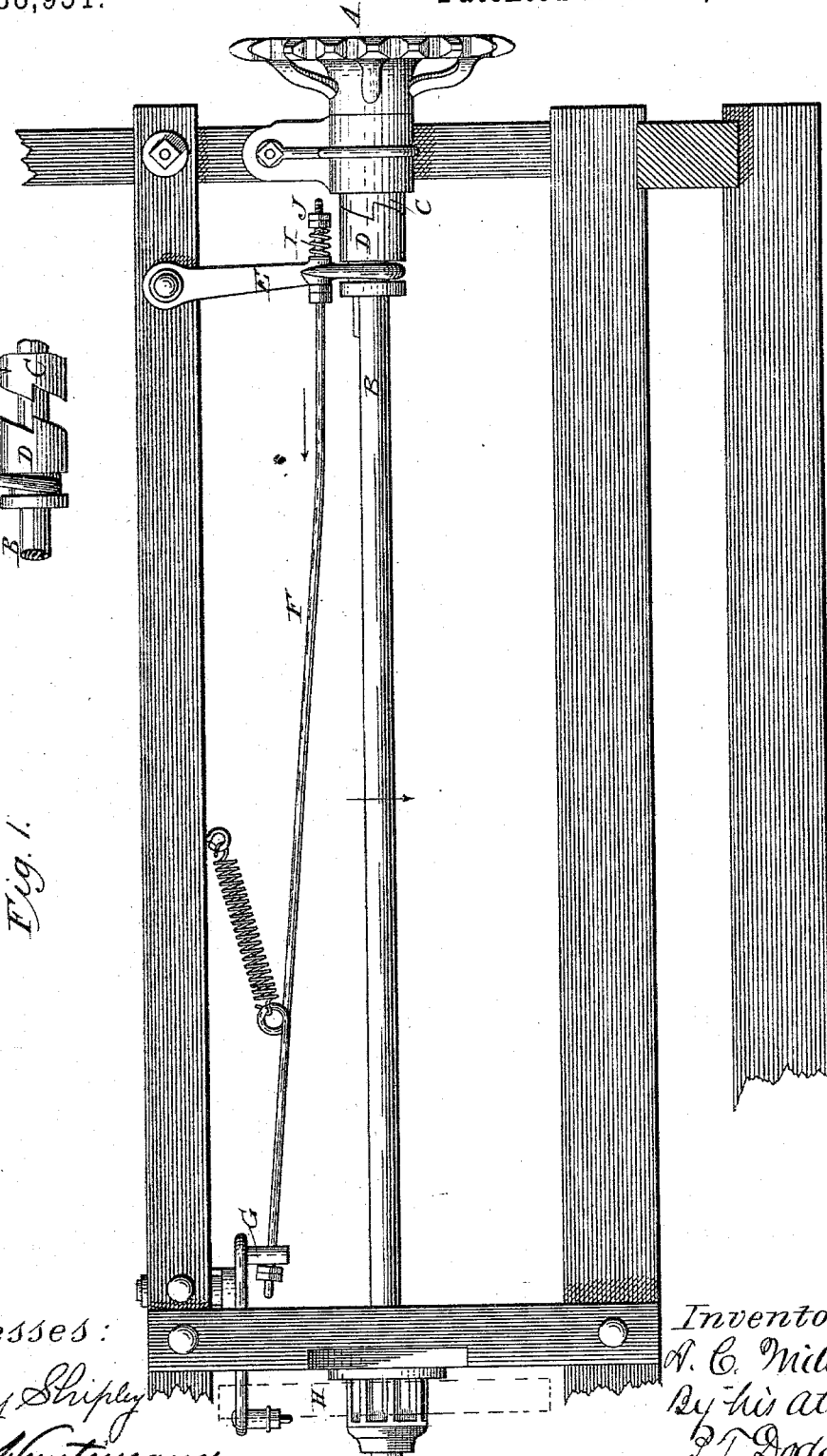

(No Model.)  
2 Sheets—Sheet 1.

A. C. MILLER.
CLUTCH

No. 288,951. Patented Nov. 20, 1883.

Witnesses:
Harry Shipley
H. Neumann

Inventor:
A. C. Miller
By his atty.
P. T. Dodge (No Model.)　　　　　　　A. C. MILLER.　　　　2 Sheets—Sheet 2.
CLUTCH.

No. 288,951.　　　　　　　　Patented Nov. 20, 1883.

Attest.
Harry Shipley
H C Huntsman

Inventor.
A. C. Miller
By his attorney
P. T. Dodge

UNITED STATES PATENT OFFICE.

ANDREW C. MILLER, OF AUBURN, N. Y., ASSIGNOR TO D. M. OSBORNE & CO., OF NEW YORK.

CLUTCH.

SPECIFICATION forming part of Letters Patent No. 288,951, dated November 20, 1883.

Application filed September 19, 1883. (No model.)

*To all whom it may concern:*

Be it known that I, ANDREW C. MILLER, of Auburn, in the county of Cayuga and State of New York, have invented certain Improvements in Clutches, of which the following is a specification.

Driving-clutches composed of two toothed interlocking parts are frequently combined with automatic uncoupling or disconnecting devices which receive motion therefrom. As these uncoupling or unshipping devices cease their motion the instant that the teeth of the cluch disengage from each other, the two parts of the clutch are not wholly separated, but remain in such position that the teeth of the driven member continue to touch those of the revolving driving member. The result is that the teeth are worn away in an objectionable manner, and a constant disagreeable chattering is produced.

It is the aim of my invention to avoid these objections by causing the entire separation of the two parts of the clutch and holding them out of contact.

To this end it consists in combining with the shifting portion of the clutch, directly or indirectly, a spring or other yielding device, whereby the movement of said part is continued after the teeth disengage.

My improvement is susceptible of embodiment in various forms; but in the drawings I have represented the preferred construction, which has given in practical use satisfactory results.

Figure 2:
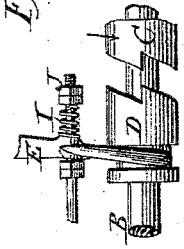
Figure 3:
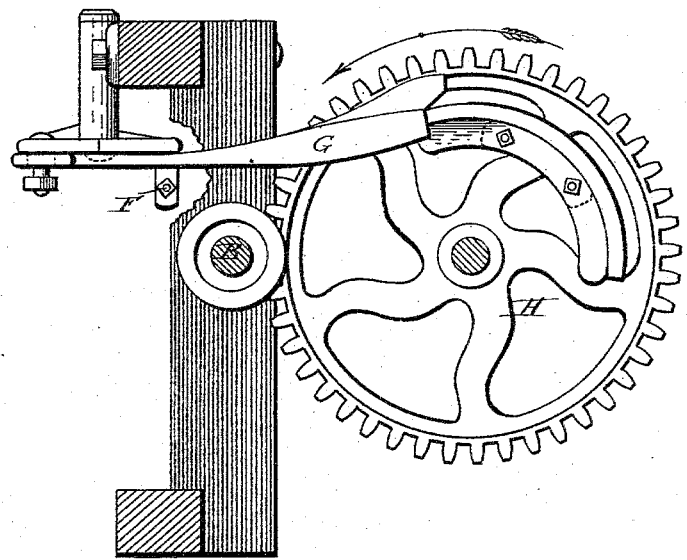

Referring to the drawings, Figure 1 represents a side elevation of a clutch mechanism having my improvement embodied therein, the clutch being in engagement. Fig. 2 is an elevation of the clutch as it appears when disengaged. Fig. 3 is an end elevation of the mechanism, looking against the ends of the shafts.

Referring to the drawings, A represents a driving-wheel mounted loosely on the end of the shaft B, and provided with the hub or sleeve C, which has its end toothed to engage and drive a corresponding hub, D, secured to the shaft by a spline or feather, which permits an end motion on the shaft. The two toothed members constitute an ordinary clutch, and serve, when in engagement, to transmit motion from the wheel to the shaft.

The automatic unshipping or uncoupling devices consist, mainly, of the forked lever E, pivoted at one end to the frame and seated at the other in the sliding hub, the rod F, extending thence to the lever G, and the cam-wheel H, by which the levers and rod are actuated to retract the hub.

Instead of attaching the rod F, as heretofore, rigidly to the lever E, I now extend it loosely through the same, encircle it by a spiral spring, I, and apply to its end nuts or equivalent devices, J, to bear against the spring. When the rod is moved in the direction indicated by the arrow in Fig. 1, the spring tends to move the sliding hub, and thereby disconnect or uncouple the clutch; but, owing to the friction between the teeth, the spring undergoes a greater or less compression before it exerts sufficient force to effect the disconnection. The disconnection relieves the teeth of the sliding hub from the driving strain and friction, so that it will move back more easily, in consequence of which the spring immediately reacts or elongates to its original proportions, thereby continuing the backward movement of the hub after the motion of the lever E has ceased, so that the teeth of said hub are widely separated from those of the driving-hub, and thus maintained, as represented in Fig. 2. Consequently the clutch will run, when out of engagement, without noise or wear. It will be understood that the only requirement is that there should be a yielding device to move the clutch and continue its motion after the disengagement of the teeth has occurred. In place of the spiral spring, a flat spring applied to the lever E or to the rod F may be employed; or, instead of arranging the spring adjacent to the clutch, it may be at any intermediate point in the train or system of devices used to move the clutch. It will also be understood that in place of the mechanism shown for shifting the driving member of the clutch any other equivalent mechanism may be employed, my improvement being applicable generally to any and all mechanisms which are arranged to automatically disengage the clutch.

In the drawings a spiral spring, J, is connected to the rod F, to restore the parts to their normal position and throw the clutch into action after the cam-wheel or other shipping devices cease to act; but this spring is not an essential part of the mechanism.

The present invention is restricted to those matters and things which are hereinafter claimed, and as to all matters which may be described or shown, but which are not claimed, the right is reserved to make the same the subject of a separate application.

I am aware that a driving-wheel arranged to slide upon a shaft and engage with a fixed clutch thereon has been combined with an intermediate spring to prevent the parts from being brought too closely together, the separation of the parts being effected by means of a positively-acting arm against the action of a second spring, which served to throw the parts into engagement whenever released. To such combination, which in no manner secures the end for which my invention is devised, I lay no claim.

Having thus described my invention, what I claim is—

1. In combination with the two members of a toothed clutch, an automatic positively-acting mechanism to cause their disengagement, and a spring applied to continue the separation of the two parts after the disengagement of their teeth, whereby the teeth are prevented from striking and wearing when the clutch is out of action.

2. In combination with the two interlocking members of a toothed clutch, automatic mechanism to cause their disengagement, embracing an elastic or yielding device, whereby the two parts of the clutch are wholly separated and held out of contact.

3. In an automatic clutch mechanism, the combination of a toothed driving member, a corresponding driven member, a spring through which the driven member is disengaged, and positively-acting mechanism to operate said spring.

4. In combination with the driver C and the movable hub D, disconnecting or uncoupling devices connected with and driven by the movable hub, and the spring, also acted upon by said hub, to cause a continued motion thereof after the disconnection.

5. The combination of the driving-hub C, driven hub D, shipper E, rod F, and spring I.

6. The combination of the toothed members C and D, lever E, spring I, rod F, lever G, and the cam-wheel for operating the last-named lever.

ANDREW C. MILLER.

Witnesses:
CHAS. W. TOWERS,
FRANK R. RATHBUN.